United States Patent [19]

Hines et al.

[11] Patent Number: 5,108,460

[45] Date of Patent: Apr. 28, 1992

[54] AZO DIMER AND TRIMER FUGITIVE TINTS

[75] Inventors: John B. Hines; Carey N. Barry, Jr., both of Spartanburg, S.C.

[73] Assignee: Milliken Research Corporation, Spartanburg, S.C.

[21] Appl. No.: 600,639

[22] Filed: Oct. 19, 1990

[51] Int. Cl.$^5$ ................................................ D06P 5/13
[52] U.S. Cl. .......................................... 8/403; 8/662; 8/687; 8/917; 8/918; 8/924
[58] Field of Search ............................................. 8/403

[56] References Cited

U.S. PATENT DOCUMENTS

| | | | |
|---|---|---|---|
| 3,157,633 | 11/1964 | Kuhn | 8/403 |
| 4,144,028 | 3/1979 | Hauser et al. | 8/403 |
| 4,167,510 | 9/1979 | Brendle | 8/403 |
| 4,877,411 | 10/1989 | Hines et al. | 8/403 |

*Primary Examiner*—A. Lionel Clingman
*Attorney, Agent, or Firm*—Timothy J. Monahan; H. William Petry

[57] ABSTRACT

Azo chromophores having polyoxyalkylene substituents are linked together by a covalent bond or by an intervening connecting group to form dimers or trimers. The polyoxyalkylene substituents are straight or branched chain polymers primarily of ethylene oxide which make the dimer and trimer colorants useful as fugitive tints.

26 Claims, No Drawings

AZO DIMER AND TRIMER FUGITIVE TINTS

BACKGROUND OF THE INVENTION

1. Field of the Invention

This invention relates to dimers and trimers of azo chromophores having polyoxyalkylene substituents. The colorants are particularly useful as fugitive tints for identifying yarn types and lots during textile manufacturing.

2. Prior Art

Fugitive tints, which have achieved wide acceptance in the textile industry, include the polyethyleneoxy-substituted tints described in Kuhn, U.S. Pat. No. 3,157,633. These tints are normally applied to yarn, such as nylon, yarn before heat setting. Such tints are a combination of a dyestuff radical and one or more polyethyleneoxy groups. Dyestuff radicals disclosed in the patent above include nitroso, nitro, azo, diphenylmethane, triarylmethane, xanthene, acridine, methine, thiazole, indamine, azine, oxazine, and o-anthraquinone radicals. Preferably, such radicals may be attached to the polymeric constituents of the tint composition by an amino nitrogen.

Fugitive coloration of nylon in particular presents special problems since the tinted yarn, or fabric woven or knitted therefrom, may be subjected to a heat-setting treatment, usually with steam. This heat-setting treatment can at times fix the tint in the fibers so that the yarns remain stained or colored, and the tint cannot be removed readily in later finish-scouring operations. Special and inconvenient reducing or oxidizing treatments to remove the tint may therefore be required.

Also, with the advent of improved continuous carpet dyeing techniques (such as the Kuster Dyer) scouring of the carpet with copious quantities of water is becoming unnecessary and, in fact, may be undesirable, except for the necessity of removing the fugitive tint. These continuous carpet dye ranges are being run at higher speed in order to increase production, further reducing the amount of scouring time that a fugitive tint would experience during dyeing.

Previously, consumers chose darker shades of carpet because they were easier to maintain and did not easily show stains. If the traditional fugitive tint inadvertently left some color on a dark colored carpet, it was often not detectable and did not detract from the appearance of the carpet. With the advent of stain-blocker technologies, consumers are choosing lighter shades of carpet because it is now possible to clean and maintain light colored carpet as easily as dark colored carpet. If any residual fugitive tint is left on light colored carpet, it is more easily noticed and is more likely to detract from the appearance of the carpet.

Furthermore, while conventional fugitive tints have in the past generally been applied at levels below about 0.2% of tint based upon the weight of the fiber, at the present time increasing tint levels are being called for to maintain proper identification of yarn ends during carpet tufting operations. When conventional fugitive tints are used at such higher levels, e.g., above about 0.2%, removal of all of the tint may become increasingly difficult or impossible.

Another shortcoming of prior art fugitive tints is that they may penetrate into non-crystalline regions and interstices in the textile fiber. Therefore, despite the water solubility of the fugitive tints, they can remain bound to the fiber and impart color to it. Additional polymeric components may be added to the colorants to increase bulk but also have the effect of lowering the color strength of the tint.

SUMMARY OF THE INVENTION

Therefore, an object of this invention is to provide a colorant suitable as a fugitive tint for textile fibers which can be used with heat setting treatment, lighter shades of product and at increased tint levels.

Another object of the invention is to provide a fugitive tint which resists penetration into non-crystalline regions and interstices in textile fibers.

Still another object of the invention is to provide a bulkier or higher molecular weight colorant without sacrificing color strength.

Accordingly, a fugitive colorant is provided having first and second polyoxyalkylene substituted azo chromophores which have been linked together. The azo chromophores are linked together by a covalent bond or a connecting group which is covalently bonded to each of the chromophores. The polyoxyalkylene substituent is a straight or branched polymer chain of at least 10 monomer units selected from ethylene oxide, propylene oxide and glycidol. Minor amounts of butylene oxide and other compatible monomer units may be present in the polyoxyalkylene chain.

Alternatively, a trimer of polyoxyalkylene substituted azo chromophores is provided. As with the aforementioned dimer, the azo chromophores are linked together by covalent bonds, preferably with an intervening connecting group.

A process for temporarily coloring an article, such as a textile fiber, is also provided. A solution of the fugitive colorant is applied to the article in sufficient strength to color the article. The colorant is subsequently rinsed off with an aqueous rinse solution. Preferably, the colorant solution is also aqueous, although other hydrophilic solvents will suffice.

The invention features relatively high molecular weight compounds with color strengths comparable to mono azo chromophores. The fugitive colorants also feature embodiments with polyoxyalkylene substituents on the free end of the azo chromophore (opposite the azo group from the point at which chromophores are linked together). The fugitivity of the colorants are thus enhanced by having hydrophilic polymer extending from each end of the colorant.

DESCRIPTION OF THE PREFERRED EMBODIMENT

Without limiting the scope of the invention, the preferred features of the invention are hereinafter set forth.

The colorants useful herein are dimers and trimers formed by linking together azo chromophores, at least one of which is polyoxyalkylene substituted. A large and diverse number of azo chromophores are known in the art and may be adapted for use herein. Particularly useful are azo chromophores characterized by the formula $R_1-N=N-R_2$, where $R_1$ and $R_2$ are aryl or a 5, 6 or 7 membered heterocycle. Both $R_1$ and $R_2$ may be substituted. By way of example, suitable substituents for $R_1$ and $R_2$ are $C_1-C_4$ alkyl, $C_1-C_4$ alkoxy, $NO_2$ halogen, hydroxyl, $SO_3H$, $CO_2H$, CN, $NR_2$, thiol, amide, sulfoxamide, $C_1-C_8$ alkyl or aryl mercaptan, $C_1-C_8$ alkyl or aryl carbonyl, halogenated $C_1-C_4$ alkyl, aryl or fused aryl groups where R is H, $C_1-C_8$ alkyl or aryl. As will be discussed in greater detail below, at least one of said chromophores, and preferably each chromophore, has a polyoxyalkylene substituent.

The azo chromophores are linked together to form a dimer or trimer by a covalent bond, a connecting group which is covalently bonded to each of the chromophores or a combination of a connecting group linking together a pair of chromophores with a third chromophore covalently bonded directly to one chromophore of the pair. Examples of suitable connecting groups between two chromophores in addition to a covalent bond are NR, O, S, $CO_2$, $SO_2$ and $C_1-C_8$ saturated alkyl where R is H, $C_1-C_8$ alkyl or aryl, with a covalent bond, $SO_2$, O, methylene and ethylene being preferred. Examples of connecting groups for three chromophores are N and $C_1-C_8$ saturated alkyl, with methine being preferred.

The dimers and trimers of the azo chromophores may be shown by the formula:

and

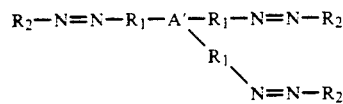

wherein $R_1$ and $R_2$ have the values assigned above, and A and A' are connecting groups for the dimer and trimer respectively.

In a preferred embodiment, the colorant has a polyoxyalkylene substituent covalently bonded to each of the azo chromophores. The polyoxyalkylene substituents are straight or branched polymers of primarily ethyleneoxide, propyleneoxide, and glycidol monomers. Minor amounts of butyleneoxide and other compatible monomers may be present in amounts not to exceed 25%. The polyoxyalkylene substituents contain at least 10 monomer units selected from ethyleneoxide, propyleneoxide, and glycidol. In a preferred embodiment, each of the polyoxyalkylene substituents contain from 10 to 400 monomer units and more preferably from 25 to 400 monomer units.

In order to enhance water solubility of the colorant, at least 50% of the monomer units of the polyoxyalkylene substituent should be comprised of ethyleneoxide monomer units, and preferably, at least 75% of the monomer units are ethyleneoxide. Glycidol monomers can be incorporated into the polyoxyalkylene substituent to promote branching. Substituents having glycidol monomers within ten monomer units of the chromophore appear to provide greater stability to the chromophore in solution. In a preferred embodiment, less than 20% of the monomer units are glycidol.

Propyleneoxide may be advantageously added onto the polyoxyalkylene substituent directly after the glycidol unit. The propylene oxide reacts with the primary hydroxyl sites of glycidol and provides a secondary hydroxyl site for further chain growth. Additional alkyleneoxide monomer units may react with either the secondary hydroxyl site of the recently added propylene oxide or with secondary hydroxyl site of the glycidol units to achieve branching. Preferably, less than 50% of the monomer units in the polyoxyalkylene substituent are propyleneoxide, and more preferably less than 20% of the monomer units are propyleneoxide.

The polyoxyalkylene substituent is bonded to the azo chromophore by a linking agent such as N, O, S, $CO_2$, $SO_2N$, $SO_2NH$, $SO_2NR$, NR, CONR, CON and CONH where R is $C_1-C_8$ alkyl or aryl. When N, CON and $SO_2N$ are the linking agents, typically two polyoxyalkylene substituents are linked to the chromophore. Preferably, the linking agent is N or O.

The polyoxyalkylene substituent may be terminated by any of a number of end groups selected by those with skill in the art. Examples of suitable end groups on the polyoxyalkylene substituent are H, alkyl, alkyl or aryl ester, aryl and benzoyl groups. Alternatively, a terminal oxygen of the substituent chain may be replaced by chlorine, bromine or fluorine.

The azo chromophores comprising the dimers and trimers herein, have one end which is bonded to another chromophore or connecting group and a free end, opposite the azo group from the bonded end. In a preferred embodiment, at least one polyoxyalkylene substituent is linked to the free end of each of the azo chromophores of a dimer or trimer. The polyoxyalkylene extends outward, enhancing solubility of the colorant.

The preferred colorants may be characterized by the formula

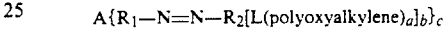

wherein $R_1-N=N-R_2$ is the azo chromophore, and $R_1$ and $R_2$ have the values described above; c is the number of chromophores, and may be 2 or 3, such that when c is 2, A is preferably NR, O, S, $CO_2$, $SO_2$ a covalent bond and $C_1-C_8$ saturated alkyl where R is H, $C_1-C_8$ alkyl or aryl, and when c is 3, A is preferably N or $C_1-C_8$ saturated alkyl;

a is the number of polyoxyalkylene substituents attached to each linking group L such that when L is O, S, $CO_2$, $SO_2NH$, $SO_2NR$, CONH, CONR and NR, a is 1 and when L is N, $SO_2N$ or CON, a is 2 where R is $C_1-C_8$ alkyl or aryl;

b is the number of linking groups attached to each azo chromophore and preferably ranges from 1 to 5. More than 5 linking groups may be bonded to each chromophore without deviating from the scope of the invention. However, when greater than 5 linking groups are attached to each chromophore, and therefore greater than up to 10 polyoxyalkylene substituents, fugitivity improvement is minimal while the cost of synthesis is substantially increased.

For most applications, the colorant is not applied to an article at full strength, but rather is dispersed or dissolved in a suitable carrier or solvent. Depending upon the particular application, concentrations of colorant in solution from 0.5 weight percent to 50 weight percent are useful. Preferably, the colorant solution contains from 1 weight percent to 40 weight percent colorant. Examples of suitable solvents are water, propylene glycol, ethylene glycol, $C_1-C_4$ alcohols and methylene chloride. In most instances, for considerations of cost, toxicity and availability, water is preferred. If the colorant is not a liquid at room temperature, it may be heated to slightly above its melting point before blending with a solvent.

In the first step of the invention, the solution containing a suitable concentration of colorant, at least enough colorant to visibly color the solution, is applied to an article. In one embodiment, the solution is applied to a textile fiber to maintain identification of the fiber during subsequent weaving, knitting or tufting operations. The solution may be applied to the textile fiber by any of a variety of methods known in the art, such as mixing the solution with a lubricant and spraying it on the fiber.

The invention is applicable to virtually every known textile fiber and is especially useful with fibers that stain easily, such as synthetic polyamides, cotton, wool and silk. In particular, the invention is useful as a fugitive tint for nylon 6 and nylon 6,6 fibers.

The invention may be further understood by reference to the following Examples, but the invention is not to be construed as being unduly limited thereby. Unless otherwise indicated, all parts and percentages are by weight.

EXAMPLE 1

Synthesis of N,N,O-tris(hydroxyethylpolyoxyethylene)-m-aminophenol (I)

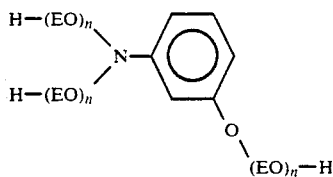

A solution of 109 g of m-aminophenol in 200 ml toluene was allowed to react with 132 g of ethylene oxide following well known ethoxylation procedures. Then 3 g potassium hydroxide followed by 4268 g of ethylene oxide were charged to the reaction which was allowed to proceed by means of well known ethoxylation procedures. About 100 molar equivalents were thus added to the starting material. The toluene was vacuum stripped from the product.

EXAMPLE 2

Synthesis of N,N-bis(hydroxyethylpolyoxyethylene, polyglycidol)aniline (II)

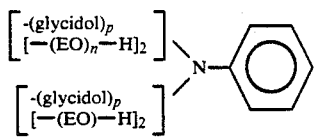

Ninety three grams of aniline were allowed to react with 296 grams glycidol by heating the aniline to 130° C. and dripping the glycidol in slowly under a nitrogen atmosphere. The product was then allowed to react with 8800 grams ethylene oxide in the presence of potassium hydroxide following well known ethoxylation procedures. About 200 molar equivalents of ethylene oxide were thus added to the starting material.

EXAMPLE 3

Synthesis of N,N-bis(hydroxyethylpolyoxyethylene, polyoxypropylene, polyglycidol)-m-toluidine (III)

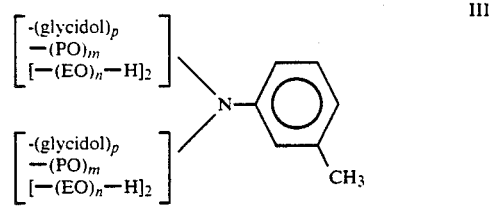

Ninety three grams of aniline were allowed to react with 296 grams glycidol by heating the aniline to 130° C. and dripping the glycidol in slowly under a nitrogen atmosphere. The product was then allowed to react with 232 grams propylene oxide followed by 8800 grams ethylene oxide in the presence of potassium hydroxide following well known ethoxylation procedures. About 4 molar equivalents of propylene oxide and 200 molar equivalents of ethylene oxide were thus added to the starting material.

EXAMPLE 4

Synthesis of N,N-bis(hydroxyethylpolyoxyethylene, polyoxypropylene, polyglycidol)-m-anisidine (IV)

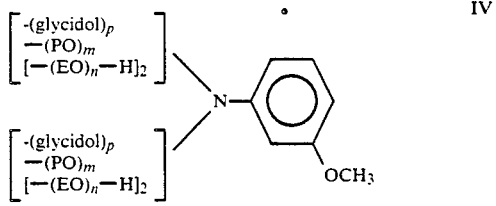

One hundred twenty-three grams of m-anisidine were allowed to react with 296 grams glycidol by heating the m-anisidine to 130° C. and dripping the glycidol in slowly under a nitrogen atmosphere. The product was then allowed to react with 232 grams propylene oxide followed by 8800 grams ethylene oxide in the presence of potassium hydroxide following well known ethoxylation procedures. About 4 molar equivalents of propylene oxide and 200 molar equivalents of ethylene oxide were thus added to the starting material.

EXAMPLE 5

Synthesis of N,N,N,N-tetrakis(hydroxyethylpolyoxyethylene)-m-phenylenediamine (V)

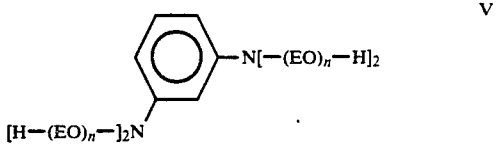

A solution of 108 g of m-phenylenediamine in 200 ml toluene was allowed to react with 132 g of ethylene oxide following well known ethoxylation procedures. Then 3 g potassium hydroxide followed by 7788 g of ethylene oxide were charged to the reaction which was allowed to proceed by means of well known ethoxylation procedures. About 180 molar equivalents were thus added to the starting material. The toluene was vacuum stripped from the product.

EXAMPLE 6

Synthesis of N,N,N,N-tetrakis(hydroxyethylpolyoxyethylene, polyglycidol)-1,8-diaminonaphthalene (VI)

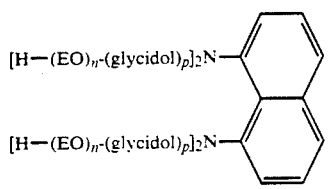

VI

One hundred fifty-eight grams of 1,8-diaminonaphthalene were allowed to react with 592 grams glycidol by heating the 1,8-diaminonaphthalene to 130° C. and dripping the glycidol in slowly under a nitrogen atmosphere. The product was then allowed to react with 8800 grams ethylene oxide in the presence of potassium hydroxide following well known ethoxylation procedures. About 8 molar equivalents of glycidol and 200 molar equivalents of ethylene oxide were thus added to the starting material.

EXAMPLE 7

Synthesis of a Orange Azo Dimer Polymeric Fugitive Tint (VII)

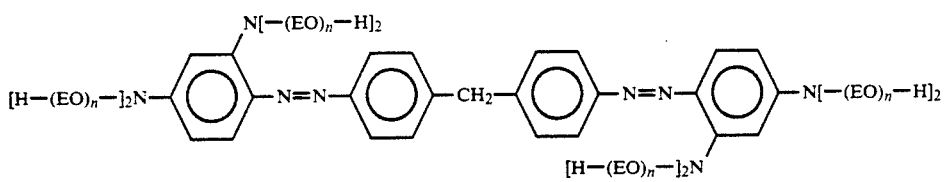

VII

A solution of 6.35 g nitrosylsulfuric acid (40%) and 5.0 g phosphoric acid were charged to a small reaction flask and were cooled to below 5° C. with an ice bath. The diazonium salt solution was made by charging 1.8 g of 4,4-methylenedianiline to the solution of acid. To another reaction flask, 243.2 g of compound V (n=44.3, 34.2% water) was charged and cooled to below 5° C. The diazonium salt solution was then charged slowly to the solution of compound V. After the charge was completed, the reaction was allowed to rise to room temperature. The reaction was then cut to a 0.6 absorptivity and neutralized to a pH 7. About 250 g of an orange tint was obtained.

EXAMPLE 8

Synthesis of a Red Azo Dimer Polymeric Fugitive Tint (VIII)

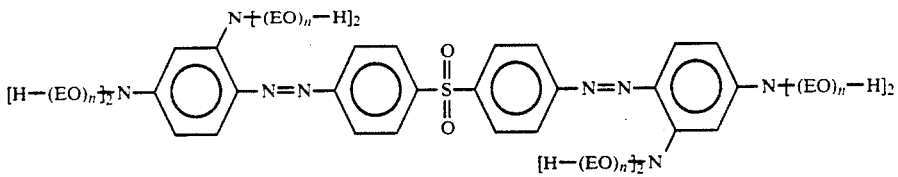

VIII

A solution of 6.35 g nitrosylsulfuric acid (40%) and 5.0 g phosphoric acid were charged to a small reaction flask and were cooled to below 5° C. with an ice bath. The diazonium salt solution was made by charging 2.2 g of 4-aminophenyl sulfone to the solution of acid. To another reaction flask, 243.2 g of compound V (n=44.3, 34.2% water) was charged and cooled to below 5° C. The diazonium salt solution was then charged slowly to the solution of compound V. After the charge was completed, the reaction was allowed to rise to room temperature. The reaction was then cut to a 0.6 absorptivity and neutralized to a pH 7. About 492 g of a red tint was obtained.

EXAMPLE 9

Synthesis Of a Yellow Azo Dimer Polymeric Fugitive Tint (IX)

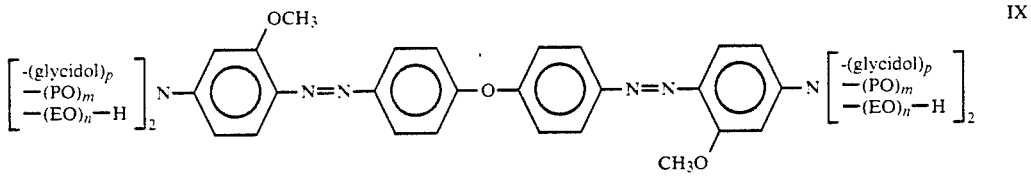

IX

A solution of 6.35 g nitrosylsulfuric acid (40%) and 5.0 g phosphoric acid were charged to a small reaction flask and were cooled to below 5° C. with an ice bath. The diazonium salt solution was made by charging 1.8 g of 4-aminophenyl ether to the solution of acid. To another reaction flask, 304.9 g of compound IV (n=106, m=2, p=2, 34.4% water) was charged and cooled to below 5° C. The diazonium salt solution was then charged slowly to the solution of compound IV. After the charge was completed, the reaction was allowed to rise to room temperature. The reaction was then cut to a 0.6 absorptivity and neutralized to a pH 7. About 571 g of an yellow tint was obtained.

EXAMPLE 10

Synthesis of a Red Azo Dimer Polymeric Fugitive Tint (X)

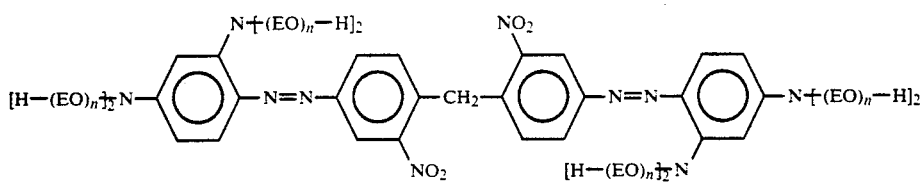

A solution of 1.6 g nitrosylsulfuric acid (40%) and 0.5 g phosphoric acid were charged to a small reaction flask and were cooled to below 5° C. with an ice bath. The diazonium salt solution was made by charging 0.6 g of 4,4-methylenebis(3-nitroaniline) to the solution of acid. To another reaction flask, 60.9 g of compound V (n=44.3, 35.0% water) was charged and cooled to below 5° C. The diazonium salt solution was then charged slowly to the solution of compound V. After the charge was completed, the reaction was allowed to rise to room temperature. The reaction was then cut to a 0.6 absorptivity and neutralized to a pH 7. About 184 g of a red tint was obtained.

EXAMPLE 11

Synthesis of a Red Azo Dimer Polymeric Fugitive Tint (XI)

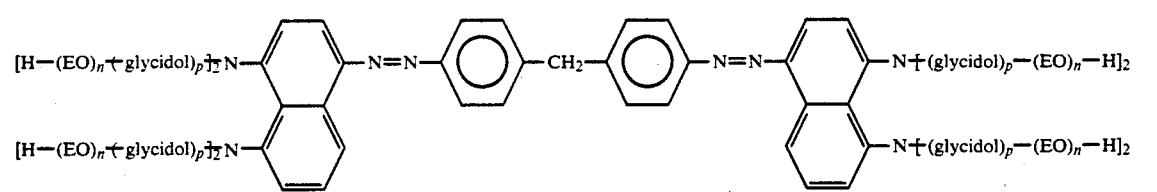

A solution of 6.35 g nitrosylsulfuric acid (40%) and 1.0 g phosphoric acid were charged to a small reaction flask and were cooled to below 5° C. with an ice bath. The diazonium salt solution was made by charging 1.8 g of 4,4'-methylenedianiline to the solution of acid. To another reaction flask, 328.3 g of compound VI (n=50, m=2, 39.5% water) was charged and cooled to below 5° C. The diazonium salt solution was then charged slowly to the solution of compound VI. After the charge was completed, the reaction was allowed to rise to room temperature. The reaction was then cut to a 0.6 absorptivity and neutralized to a pH 7. About 435 g of a red tint was obtained.

EXAMPLE 12

Synthesis of a Yellow Azo Trimer Polymeric Fugitive Tint (XII)

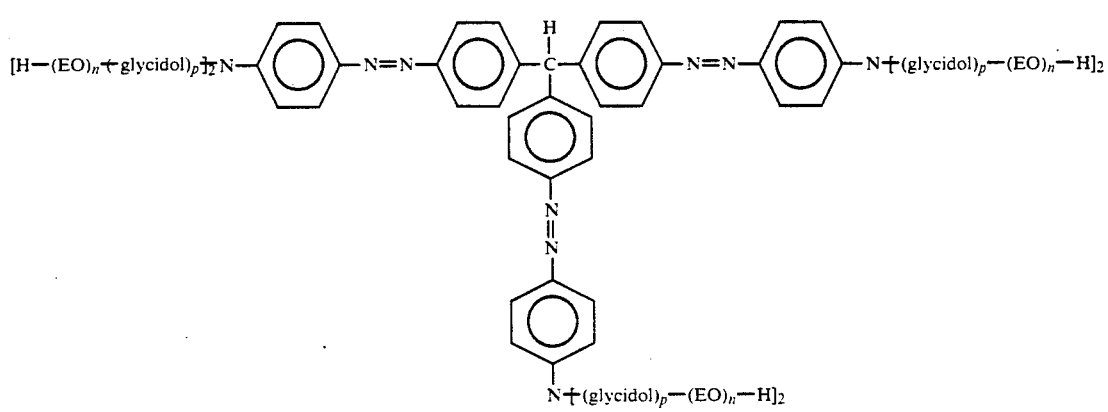

A solution of 31.8 g nitrosylsulfuric acid (40%) and 5.0 g phosphoric acid were charged to a small reaction flask and were cooled to below 5° C. with an ice bath. The diazonium salt solution was made by charging 9.2 g of pararosaniline to the solution of acid. To another reaction flask, 76.7 g of compound II (n=82.5, M=2 40.0% water) was charged and cooled to below 5° C. the diazonium salt solution (5.1 g) was then charged slowly to the solution of compound II. After the charge was completed, the reaction was allowed to rise to room temperature. The reaction was then cut to a 0.6 absorptivity and neutralized to a pH 7. About 118 g of a yellow tint was obtained.

EXAMPLE 13

Synthesis of a Orange Azo Dimer Polymeric Fugitive Tint (XIII)

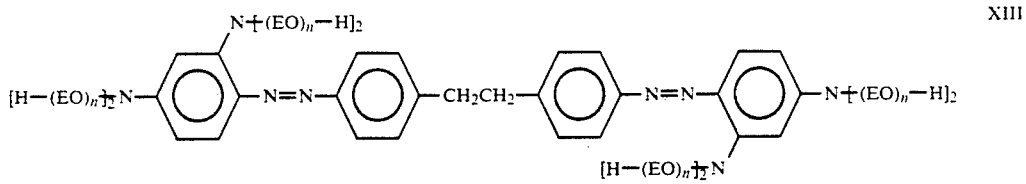

XIII

A solution of 6.35 g nitrosylsulfuric acid (40%) and 1.0 g phosphoric acid were charged to a small reaction flask and were cooled to below 5° C. with an ice bath. The diazonium salt solution was made by charging 1.9 g of 4,4-ethylenedianiline to the solution of acid. To another reaction flask, 79.0 g of compound V (n=44.3, 35.0% water) was charged and cooled to below 5° C. The diazonium salt solution (0.95 g) was then charged slowly to the solution of compound V. After the charge was completed, the reaction was allowed to rise to room temperature. The reaction was then cut to a 0.6 absorptivity and neutralized to a pH 7. About 161 g of an orange tint was obtained.

EXAMPLE 14

Synthesis of a Orange Azo Dimer Polymeric Fugitive Tint (XIV)

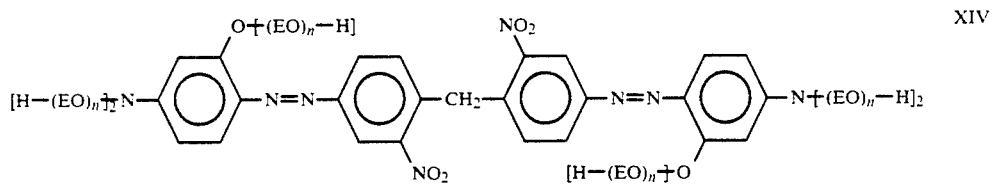

XIV

A solution of 24.2 g nitrosylsulfuric acid (40%) and 3.8 g phosphoric acid were charged to a small reaction flask and were cooled to below 5° C. with an ice bath. The diazonium salt solution was made by charging 10.0 g of 4,4-methylenebis(3-nitroaniline) to the solution of acid. To another reaction flask, 49.3 g of compound I (n=47.7, 35.0% water) was charged and cooled to below 5° C. The diazonium salt solution (2.6 g) was then charged slowly to the solution of compound I. After the charge was completed, the reaction was allowed to rise to room temperature. The reaction was then cut to a 0.6 absorptivity and neutralized to a pH 7. About 61 g of an orange tint was obtained.

EXAMPLE 15

Synthesis of a Yellow Azo Dimer Polymeric Fugitive Tint (XV)

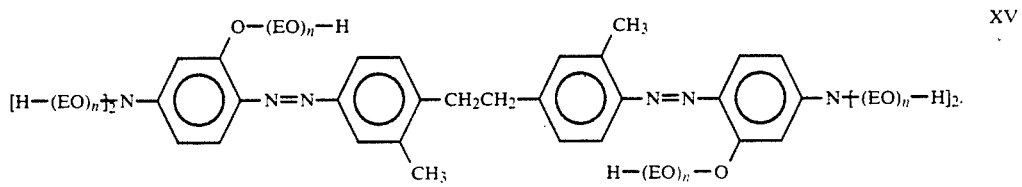

XV

A solution of 31.8 g nitrosylsulfuric acid (40%) and 5.0 g phosphoric acid were charged to a small reaction flask and were cooled to below 5° C. with an ice bath. The diazonium salt solution was made by charging 1.8 g of 4,4-ethylenedi-m-toluidine to the solution of acid. To another reaction flask, 98.6 g of compound I (n=47.7, 35.1% water) was charged and cooled to below 5° C. The diazonium salt solution was then charged slowly to the solution of compound I. After the charge was completed, the reaction was allowed to rise to room temperature. The reaction was then cut to a 0.6 absorptivity and neutralized to a pH 7. About 270 g of an yellow tint was obtained.

EXAMPLE 16

Synthesis of a Yellow Azo Dimer Polymeric Fugitive Tint (XVI)

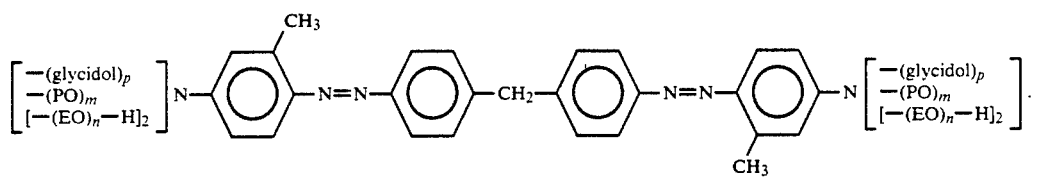

XVI

A solution of 31.8 g nitrosylsulfuric acid (40%) and 5.0 g phosphoric acid were charged to a small reaction flask and were cooled to below 5° C. with an ice bath. The diazonium salt solution was made by charging 9.0 g of 4,4-methylenedianiline to the solution of acid. To another reaction flask, 333.0 g of compound III (n=107, m=2, p=2, 40.0% water) was charged and cooled to below 5° C. The diazonium salt solution (9.3 g) was then charged slowly to the solution of compound III. After the charge was completed, the reaction was allowed to rise to room temperature. The reaction was then cut to a 0.6 absorptivity and neutralized to a pH 7. About 734 g of an yellow tint was obtained.

EXAMPLE 17

Synthesis of a Purple Azo Dimer Polymeric Fugitive Tint (XVII)

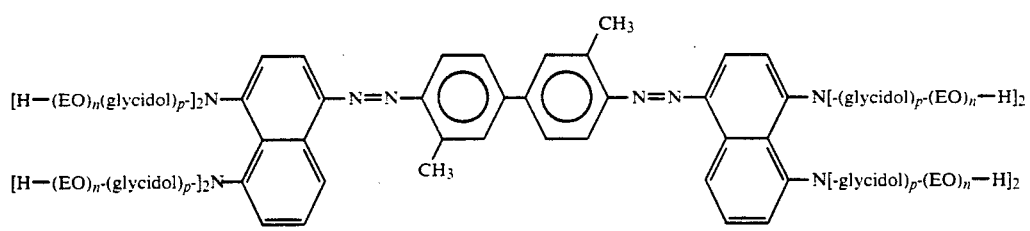

XVII

A solution of 6.35 g nitrosylsulfuric acid (40%) and 1.0 g phosphoric acid were charged to a small reaction flask and were cooled to below 5° C. with an ice bath. The diazonium salt solution was made by charging 2.2 g of 3,3'-dimethylbenzidine to the solution of acid. To another reaction flask, 328.3 g of compound VI (n=50, m=2, 39.5% water) was charged and cooled to below 5° C. The diazonium salt solution was then charged slowly to the solution of compound VI. After the charge was completed, the reaction was allowed to rise to room temperature. The reaction was then cut to a 0.6 absorptivity and neutralized to a pH 7. About 363 g of an purple tint was obtained.

EXAMPLE 18

Synthesis of a Yellow Azo Dimer Polymeric Fugitive Tint (XVIII)

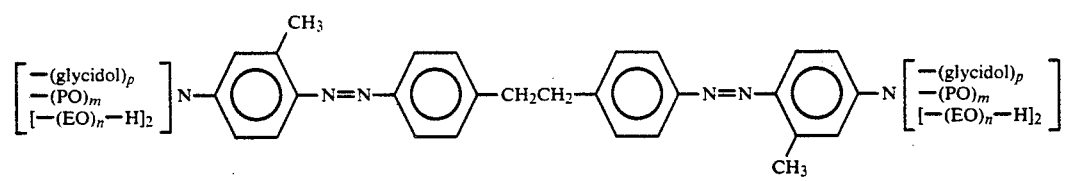

XVIII

A solution of 31.8 g nitrosylsulfuric acid (40%) and 5.0 g phosphoric acid were charged to a small reaction flask and were cooled to below 5° C. with an ice bath. The diazonium salt solution was made by charging 2.1 g of 4,4'-ethylenedianiline to the solution of acid. To another reaction flask, 338.1 g of compound III (n=107, m=2, p=2, 39.4% water) was charged and cooled to below 5° C. The diazonium salt solution (9.3 g) was then charged slowly to the solution of compound III. After the charge was completed, the reaction was allowed to rise to room temperature. The reaction was then cut to a 0.6 absorptivity and neutralized to a pH 7. About 564 g of an yellow tint was obtained.

EXAMPLE 19

Synthesis of a Yellow Azo Dimer Polymeric Fugitive Tint (XIX)

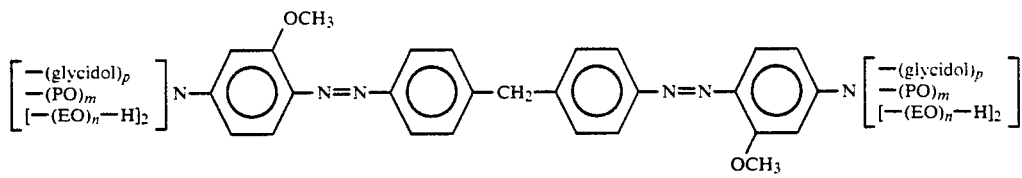

XIX

A solution of 6.4 g nitrosylsulfuric acid (40%) and 5.0 g phosphoric acid were charged to a small reaction flask and were cooled to below 5° C. with an ice bath. The diazonium salt solution was made by charging 1.8 g of 4,4-methylenedianiline to the solution of acid. To another reaction flask, 304.9 g of compound IV (n=106, m=2, p=2, 34.4% water) was charged and cooled to below 5° C. The diazonium salt solution (9.2 g) was then charged slowly to the solution of compound IV. After the charge was completed, the reaction was allowed to rise to room temperature. The reaction was then cut to a 0.6 absorptivity and neutralized to a pH 7. About 270 g of an yellow tint was obtained.

COMPARATIVE TESTING

Fugitivity Testing of Azo Dimer Polymeric Fugitive Tints

A test was constructed which would simulate actual processing conditions that textile materials would encounter during heat setting, tufting, and continuous dying in order to make carpet. This test was used to determine the fugitivity of various tints when they were subjected to these conditions.

First, 4 inch by 4 inch undyed squares of nylon carpet were cut, and the level of color on them was determined using a Hunter Labscan Colorimeter. The samples were then sprayed with a tint solution such that around 0.5% by weight tint was applied to the carpet square. The samples were allowed to dry overnight and were then read on the colorimeter again. The samples were then heat set in an autoclave, read again on the colorimeter, and allowed to age for one week. They were then dipped in an acid solution for 30 seconds and then vacuumed. They were dipped in a more acidic solution and allowed to drain. The samples were sprayed twice with water and vacuumed. They were then steamed and vacuumed a final time. The wet samples were dried in a convection oven and read one last time on a colorimeter. The results of this last color measurement were compared to the first. A five point scale was developed in which a score of 5.00 indicates that the tint was 100% fugitive, and the carpet square returned to its completely white shade.

The above test was performed using the azo dimer tints shown in Structure IX, XVIII and XIX. These dimers contain the same azo chromophores which are connected by —O—, —CH$_2$CH$_2$— and —CH$_2$—, respectively. The polyoxyalkylene substituents of the dimers are similar Also tested was a mono azo, polyoxyalkylene substituted chromophore comparable to the azo chromophores comprising the azo dimers. The structure of the mono azo compound is set forth below as Structure XX.

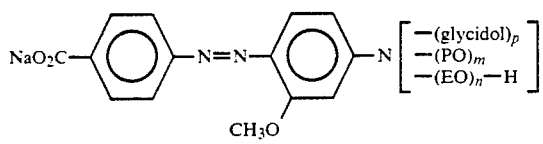

The results of the comparative testing is summarized in Table 1. All of the azo dimer colorants were more fugitive than the corresponding mono azo colorant. The enhanced fugitivity of the azo dimers represents a synergistic effect relative to the mono azo colorant of equal color strength.

TABLE 1

| Tint | Type | Score |
| --- | --- | --- |
| Compound IX | Azo Dimer | 3.47 |
| Compound XVIII | Azo Dimer | 3.27 |
| Compound XIX | Azo Dimer | 3.25 |
| Compound XX | Mono Azo | 2.78 |

There are, of course, many alternate embodiments and modifications which are intended to be included within the scope of the following claims.

We claim:

1. A fugitive colorant comprising a dimer or trimer of an azo chromophore selected from compounds of the formula:

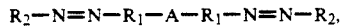

and

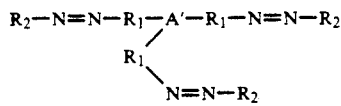

wherein $R_1$—N=N—$R_2$ is an azo chromophore and $R_1$ and $R_2$ are aryl, either of which aryl may be substituted with one or more of $C_1$-$C_4$ alkyl, $C_1$-$C_4$ alkoxy, NO$_2$, halogen, hydroxyl, SO$_3$H, CO$_2$H, CN, N(R)$_2$, thiol, amide, sulfanamide, $C_1$-$C_8$ alkyl mercaptan or aryl mercaptan, $C_1$-$C_8$ alkyl carbonyl or aryl carbonyl, halogenated $C_1$-$C_4$ alkyl or halogenated aryl, where R is H, $C_1$-$C_8$ alkyl or aryl;

A is a chromophore connecting group selected from NR, O, S, CO$_2$, SO$_2$, a covalent bond and $C_1$-$C_8$ saturated alkyl, A is a chromophore connecting group selected from N or $C_1$-$C_8$ saturated alkyl; and at least one polyoxyalkylene straight or branched polymer chain of at least ten monomer units selected from ethyleneoxide, propylene oxide, and glycidol, linked to each $R_2$ by a linking group selected from N, O, S, CO$_2$, SO$_2$N, SO$_2$NH, SO$_2$NR, NR, CONR, CON and CONH, where R is H, $C_1$-$C_8$ alkyl or aryl.

2. A fugitive colorant according to claim 1, wherein each of said polyoxyalkylene chain comprises from between 25 to 400 of said monomer units.

3. A fugitive colorant according to claim 2, wherein at least 75% of said polyoxyalkylene chain comprises ethylene oxide monomer units.

4. A fugitive colorant according to claim 1, wherein $R_1$ is selected from phenyl, nitrophenyl, methylphenyl, and methoxyphenyl, and $R_2$ is selected from naphthyl, phenyl, methoxyphenyl, and methylphenyl.

5. A fugitive colorant according to claim 4, wherein A is selected from SO$_2$, O, a covalent bond, methylene and ethylene, and A' is methine.

6. A fugitive colorant according to claim 5, wherein each of said polyoxyalkylene chain comprises from between 10 and 400 of said monomer units.

7. A fugitive colorant according to claim 6, wherein at least 50% of said polyoxyalkylene chain comprises ethyleneoxide monomer units.

8. A fugitive colorant according to claim 7, wherein said linking group is selected from N and O.

9. A process for temporarily coloring a textile fiber comprising the steps of:

applying an aqueous solution of a fugitive colorant to a textile fiber is sufficient concentration to provide coloration to said textile fiber, wherein said colorant is selected from compounds of the formula

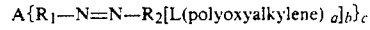

wherein $R_1$—N=N—$R_2$ is an azo chromophore, and $R_1$ and $R_2$ are aryl, either of which aryl may be substituted with one or more of $C_1$-$C_4$ alkyl, $C_1$-$C_4$ alkoxy, NO$_2$, halogen, hydroxyl, SO$_3$H, CO$_2$H, CN, N(R)$_2$, thiol, amide, sulfoxamide, $C_1$-$C_8$ alkyl mercaptan or aryl mercaptan, $C_1$-$C_8$ alkyl carbonyl or aryl carbonyl, halogenated $C_1$-$C_4$ alkyl or halogenated aryl, where R is H, $C_1$-$C_8$ alkyl or aryl;

L is a linking group selected from N, O, S, CO$_2$, SO$_2$N, SO$_2$NH, SO$_2$NR, NR, CONR, CON and CONH, where R is H, $C_1$-$C_8$ alkyl or aryl, between said chromophore and a polyoxyalkylene substituent having a straight or branched polymer chain of at least 10 monomer units selected from ethyleneoxide, propyleneoxide and glycidol;

a is a chromophore connecting group selected from NR, O, S, CO$_2$, SO$_2$, a covalent bond and $C_1$-$C_8$ saturated alkyl when c is 2 and A is $C_1$-$C_8$ saturated alkyl or N when c is 3;

a is 1 when L is O, S, CO$_2$, SO$_2$NH, SO$_2$NR, CONH and NR, and 2 when L is N, SO$_2$N and CON;

b is 1 to 5; and c is 2 or 3 and rinsing said colorant from said textile fiber with an aqueous rinse solution.

10. A process according to claim 9 wherein $R_1$ is selected from phenyl, nitrophenyl, methylphenyl, and methoxyphenyl and $R_2$ is selected from naphthyl, phenyl, methoxyphenyl, and methylphenyl.

11. A process according to claim 10 wherein each of said polyoxyalkylene chains comprises from between 10 and 400 of said monomer units and at least 50% of said monomer units are ethyleneoxide.

12. A process according to claim 10 wherein each of said polyoxyalkylene chains comprises from between 25 and 400 of said monomer units and at least 75% of said monomer units are ethyleneoxide.

13. A process according to claim 9, wherein said colorant is selected from compounds of the formula

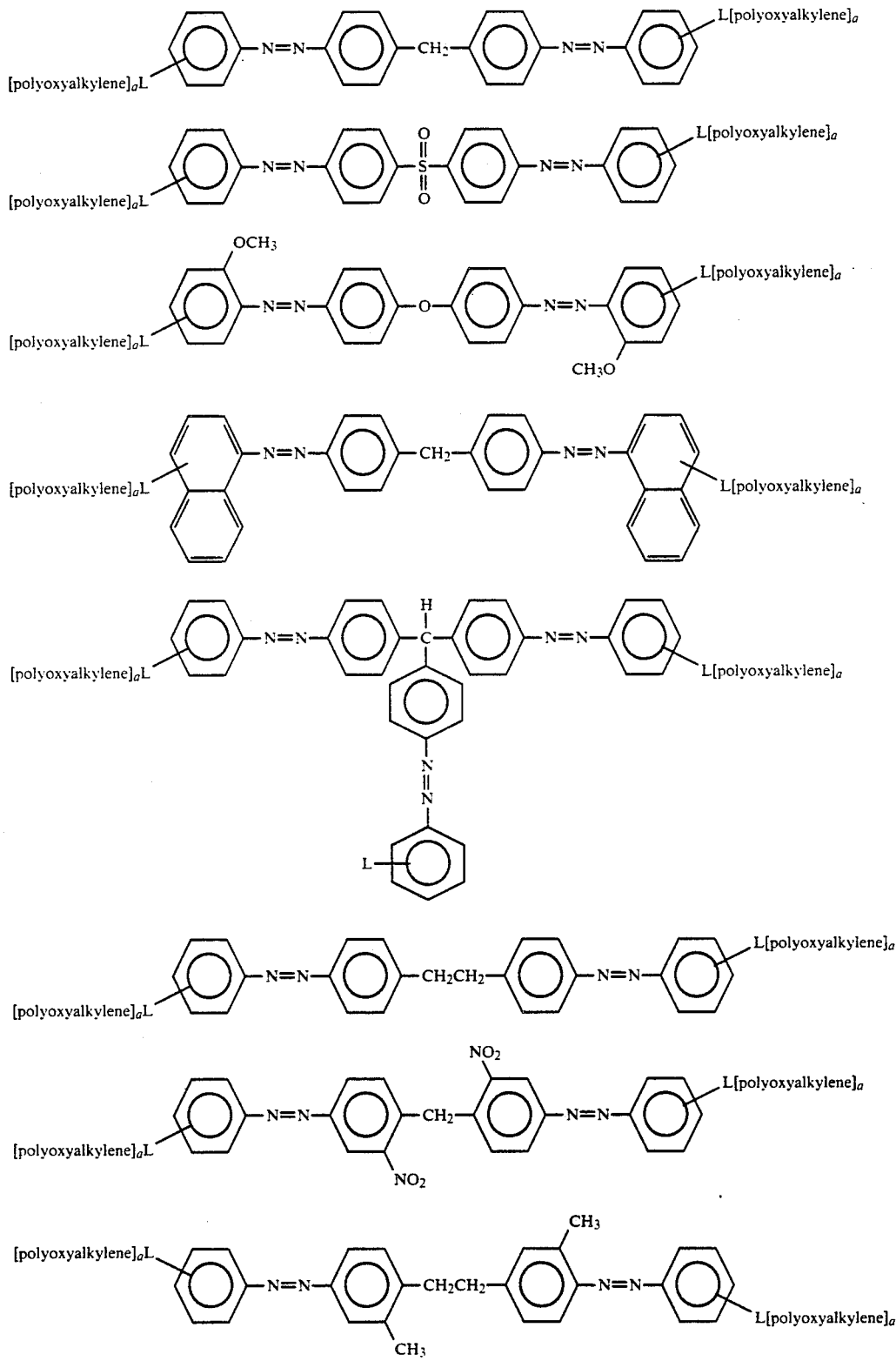

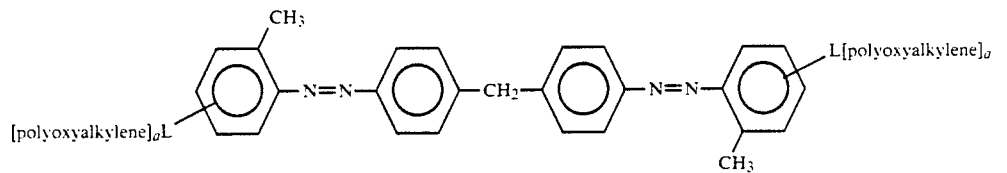

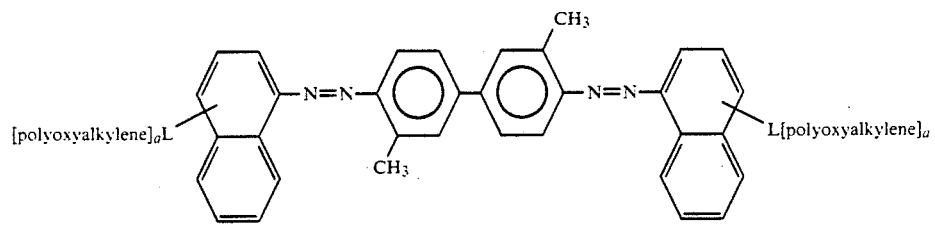

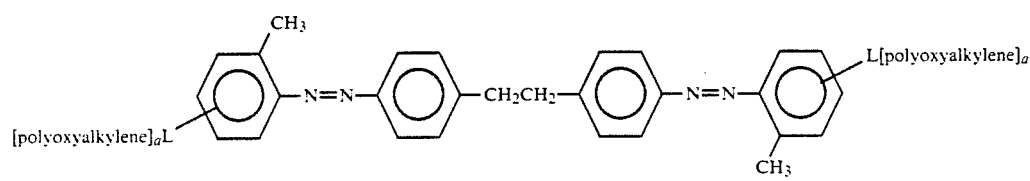

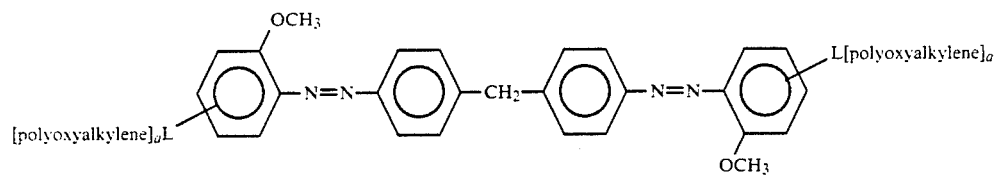

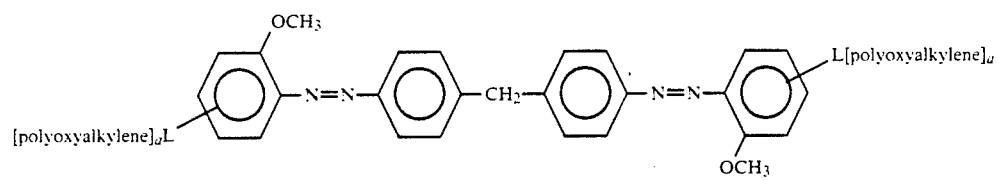

14. A process according to claim 12, wherein each of said polyoxyalkylene chains comprises from between 10 and 400 of said monomer units and at least 50% of said monomer units are ethyleneoxide.

15. A process according to claim 9, wherein said colorant is selected from compounds of the formula:

16. A process according to claim 15, wherein each of said polyoxyalkylene chains comprises from between 25 and 400 of said monomer units and at least 75% of said monomer units are ethyleneoxide.

17. A fugitive colorant comprising a compound selected from compounds of the formula:

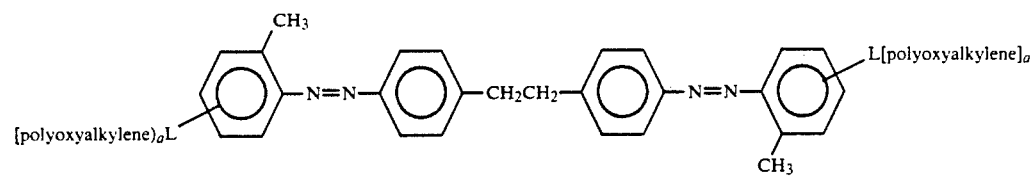

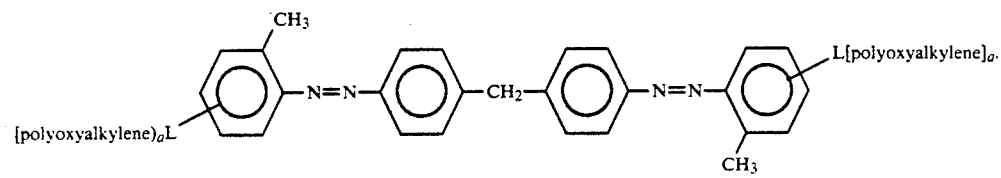

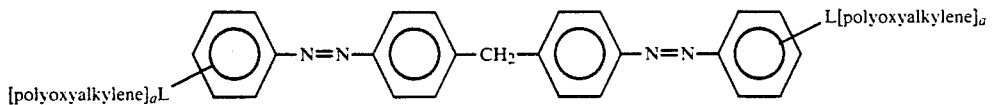
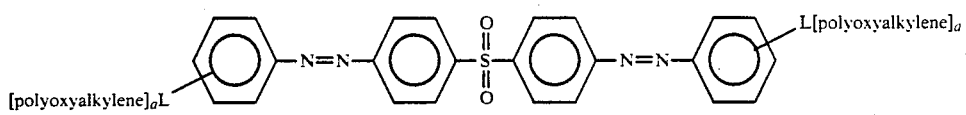
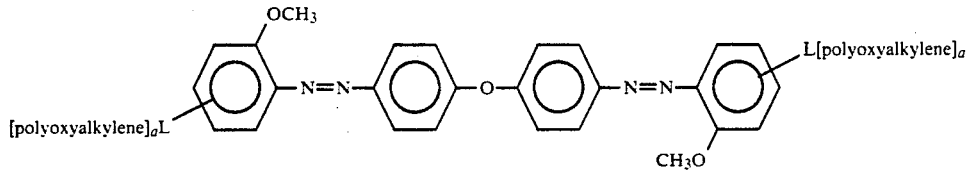
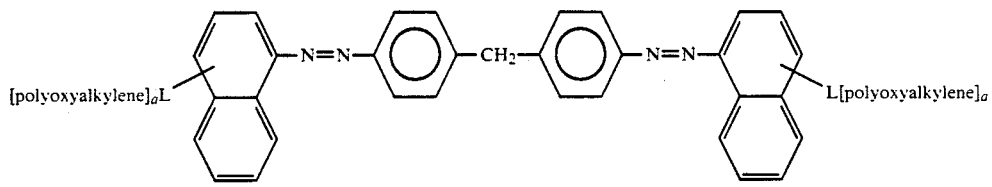
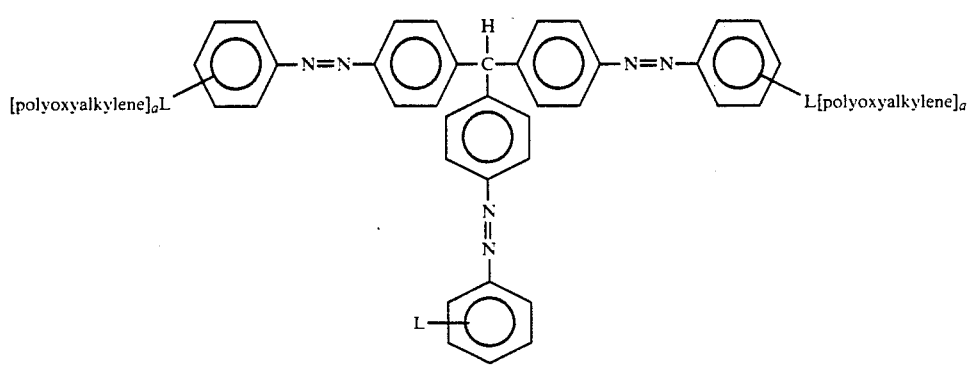
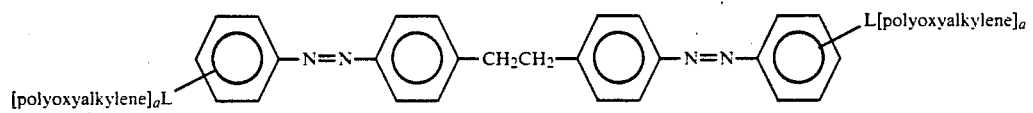
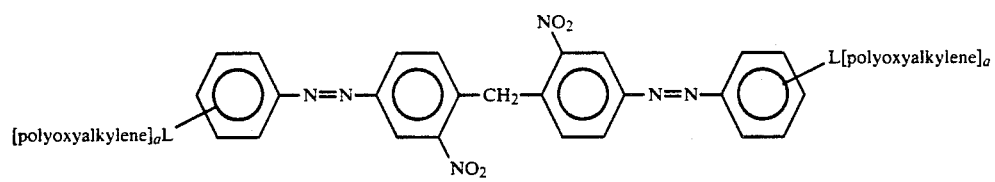
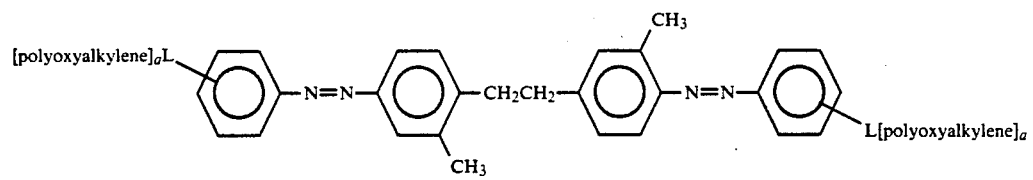
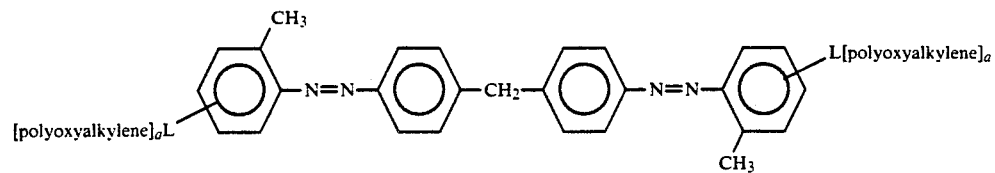

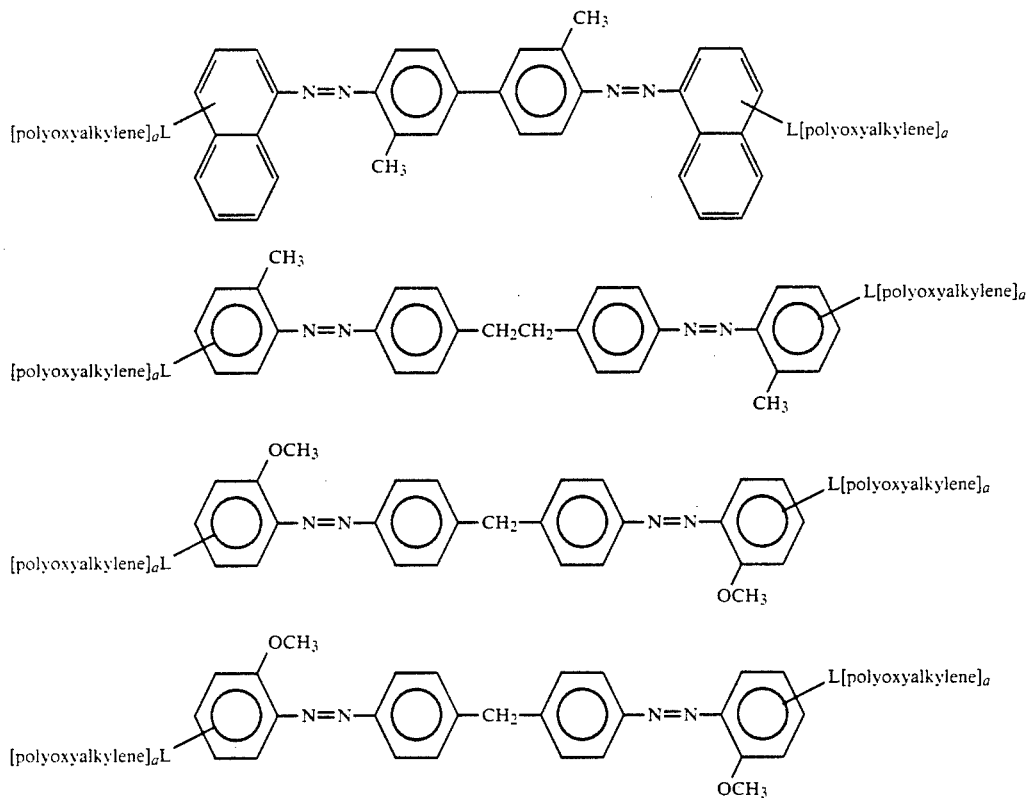

where "L" is a linking group selected from N, O, S, $CO_2$, $SO_2N$, $SO_2NH$, $SO_2NR$, NR, CONR, CON and CONH, and R is $C_1$-$C_8$ alkyl or aryl; "polyoxyalkylene" is a polyoxyalkylene substituent having a straight or branched polymer chain of at least 10 monomer units selected from ethyleneoxide, propyleneoxide and glycidol; and a is 1 when L is O, S, $CO_2$, $SO_2NH$, $SO_2NR$, CONH and NR, and 2 when L is N, $SO_2N$ and CON.

18. A fugitive colorant according to claim 17, wherein each of said polyoxyalkylene chains comprises from between 10 and 400 of said monomer units.

19. A fugitive colorant according to claim 18, wherein at least 50% of said polyoxyalkylene chains comprises ethyleneoxide.

20. A fugitive colorant according to claim 17, selected from compounds of the formula:

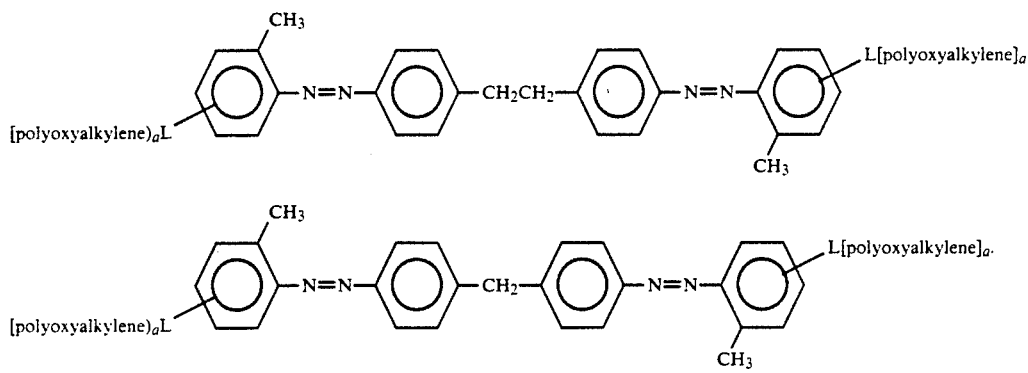

21. A fugitive colorant according to claim 20, wherein each of said polyoxyalkylene chains comprises from between 25 and 400 of said monomer units and at least 75% of said polyoxyalkylene chain comprises ethyleneoxide monomer units.

22. A fugitive colorant comprising a first azo chromophore having at least one polyoxyalkylene substituent characterized by a straight or branched polymer chain of at least 10 monomer units selected from ethyleneoxide, propyleneoxide and glycidol;

a second azo chromophore having at least one polyoxyalkylene substituent characterized by a straight or branched polymer chain of at least ten monomer units selected from ethyleneoxide, propyleneoxide and glycidol; and wherein said second azo chromophore is connected to said first azo chromophore by a covalent bond or by a connecting group which is covalently bonded to both said first and second azo chromophores, where said connecting group selected from O, S, $CO_2$, $SO_2$, $C_1$-$C_8$ saturated alkyl and NR where R is H, $C_1$-$C_8$ alkyl or aryl.

23. A fugitive colorant according to claim 22, wherein each of said polyoxyalkylene chains comprises from between 10 and 400 of said monomer units and at least 50% of said polyoxyalkylene chain comprise ethylene oxide monomer units.

24. A fugitive colorant according to claim 22, wherein said polyoxyalkylene substituent of said first azo chromophore is bound to said first azo chromophore by a linking group selected from N, O, S, $CO_2$, $SO_2N$, $SO_2NH$, $SO_2NR$, NR, CONR, CON and CONH, where R is H, $C_1$-$C_8$ alkyl or aryl, and further said polyoxyalkylene substituent of said second azo chromophore is bound to said second azo chromophore by a linking group selected from N, O, S, $CO_2$, $SO_2N$, $SO_2NH$, $SO_2NR$, NR, CONR, CON and CONH, where R is H, $C_1$-$C_8$ alkyl or aryl.

25. A fugitive colorant according to claim 24, wherein each of said polyoxyalkylene chains comprises from between 10 and 400 of said monomer units and at least 50% of said polyoxyalkylene chain comprise ethylene oxide monomer units.

26. A fugitive colorant according to claim 25 wherein said linking groups for said first and second azo chromophores are selected from N and O.

* * * * *